(12) United States Patent
Jiang et al.

(10) Patent No.: US 8,920,678 B2
(45) Date of Patent: Dec. 30, 2014

(54) DISPERSIONS AND FILMS COMPRISING CONDUCTING POLYMER FOR OPTOELECTRONIC DEVICES

(75) Inventors: Xuezhong Jiang, Fogelsville, PA (US); Roy Daniel Bastian, Bethlehem, PA (US)

(73) Assignee: Samsung Electronics Co., Ltd. (KR)

(*) Notice: Subject to any disclaimer, the term of this patent is extended or adjusted under 35 U.S.C. 154(b) by 1437 days.

(21) Appl. No.: 11/855,283

(22) Filed: Sep. 14, 2007

(65) Prior Publication Data

US 2008/0023674 A1    Jan. 31, 2008

Related U.S. Application Data

(63) Continuation of application No. 10/755,426, filed on Jan. 12, 2004, now Pat. No. 7,270,871.

(51) Int. Cl.
| | |
|---|---|
| H01B 1/12 | (2006.01) |
| C08G 75/00 | (2006.01) |
| C08G 61/12 | (2006.01) |
| C08J 5/18 | (2006.01) |

(52) U.S. Cl.
CPC .............. C08J 5/18 (2013.01); C08G 61/126 (2013.01); H01B 1/127 (2013.01); C08L 2205/14 (2013.01); C08J 2365/00 (2013.01)
USPC ........ 252/500; 252/511; 252/501.1; 528/226; 528/377; 528/380

(58) Field of Classification Search
CPC .......... H01B 1/127; H01B 1/124; H01B 1/12; H01B 1/20; C09D 11/52; C08G 61/123; C08G 61/126; C08G 75/00; C08F 8/34; H01L 51/0036; H01L 51/0037; H01L 51/5008; Y10S 428/917; Y10S 428/926
USPC .............. 252/500, 511, 501.1; 428/690, 704, 428/327, 917; 528/377, 380, 373, 391, 226; 257/40
See application file for complete search history.

(56) References Cited

U.S. PATENT DOCUMENTS

| | | | |
|---|---|---|---|
| 4,639,328 | A | 1/1987 | Krause et al. |
| 4,910,645 | A | 3/1990 | Jonas et al. |

(Continued)

FOREIGN PATENT DOCUMENTS

| | | |
|---|---|---|
| EP | 1275651 | 1/2003 |
| EP | 1300430 | 4/2003 |
| JP | 03038588 | 2/1991 |

OTHER PUBLICATIONS

Lee et al, "Aqueous Phase Polymerization of Thieno[3,4-b]thiophene," Polymer Preprints 2002, 43(2), 568-569.*

(Continued)

*Primary Examiner* — Stanley Silverman
*Assistant Examiner* — Kallambella Vijayakumar
(74) *Attorney, Agent, or Firm* — Cantor Colburn LLP (57) ABSTRACT

A dispersion, and a film and optoelectronic devices formed from the dispersion are provided. The dispersion comprising conducting polymer containing particles having a particle size of less than 450 nm, wherein the conducting polymer comprises substituted or unsubstituted, uncharged or charged polymerized units of thieno[3,4-b]thiophene, and wherein a film drop cast from the dispersion has a conductivity from $10^{-1}$ to $10^{-6}$ S/cm measured using the four point probe method.

13 Claims, 5 Drawing Sheets

(56) References Cited

U.S. PATENT DOCUMENTS

| | | | |
|---|---|---|---|
| 4,935,164 | A | 6/1990 | Wessling et al. |
| 4,959,430 | A | 9/1990 | Jonas et al. |
| 5,066,731 | A | 11/1991 | Feldhues et al. |
| 5,213,714 | A | 5/1993 | Kampf et al. |
| 5,300,575 | A | 4/1994 | Jonas et al. |
| 5,354,613 | A * | 10/1994 | Quintens et al. ............. 428/341 |
| 5,498,761 | A | 3/1996 | Wessling et al. |
| 5,540,999 | A | 7/1996 | Yamamoto et al. |
| 5,567,355 | A | 10/1996 | Wessling et al. |
| 5,766,515 | A | 6/1998 | Jonas et al. |
| 6,004,483 | A | 12/1999 | Jonas et al. |
| 6,083,635 | A | 7/2000 | Jonas et al. |
| 6,175,441 | B1 | 1/2001 | Heuer et al. |
| 6,391,481 | B1 * | 5/2002 | Jonas et al. ................... 428/690 |
| 7,071,289 | B2 * | 7/2006 | Sotzing ......................... 528/377 |
| 7,125,479 | B2 | 10/2006 | Sotzing |
| 2004/0010115 | A1 | 1/2004 | Sotzing |
| 2004/0074779 | A1 | 4/2004 | Sotzing |
| 2005/0124784 | A1 * | 6/2005 | Sotzing ......................... 528/380 |

OTHER PUBLICATIONS

Tang. C.W., et al; "Organic electroluminescent diodes."; Appl. Phys. Lett. 51(12), 1987; p. 913-915.

Burroughes, J.H., et al; "Light-emitting diodes based on conjugated polymers," Nature; vol. 347, 1990; p. 539-541.

Yang Y et al; "Polyaniline as a transparent electrode for polymer light-emitting diodes: Lower operating voltage and higher efficiency;" App. Phys. Lett. 64 (10); Mar. 1994; p. 1245-1247.

Pomerantz, M.; et al; "Poly(2-decylthieno?3,4-b)thiophene). A New Soluble Low-Bandgap Conducting Polymer," Synthetic Metals 84; 1997; p. 243-244.

Roman, et al., "High Quantum Efficiency Polythiophene/C60 Photodiodes;" Adv. Mater. 1998, 10, p. 774-777.

Jiang, X; et al, "Organic light-emitting diodes made with poly(N-vinylcarbazole) (PVK) and 8-hydroxyquinoline aluminium (Alq3)," Synthetic Metals 87, 1997, p. 175-178.

Tsuie, et al; "Electroactive and luminescent polymers: new fluorene-heterocycle-based hybrids;" J. Mater. Chem., 9, 1999, p. 2189-2200.

Bernius. et a;' "Progress with Light-Emitting Polymers," Advanced Materials, 12, No. 23, 2000, p. 1737 1750.

Ho, Peter K.H.; et al, "Molecular-scale interface engineering for polymer light-emitting diodes," Nature, vol. 404, 2000, p. 481-484.

Sotzing, et al, "Preparation and Properties of Vapor Detector Arrays Formed from Poly(3,4-ethylenedioxy)thiophene-Poly(styrene sulfonate)/Insulating Polymer Composites," Anal. Chem, 72, 2000, p. 3181-3190.

Sotzing, et al, "Highly Sensitive Detection and Discrimination of Biogenic Amines Utilizing Arrays of Polyaniline/Carbon Black Composite Vapor Detectors," Chem Mater. 12, 2000 p. 593-595.

Jabbour, et al; "High Tg Hole Transport Polymers for the Fabrication of Bright and Efficient Organic Light-Emitting Devices with an Air-Stable Cathode," IEEE Journal of Quantum Electronics, vol. 36.(!). 2000, p. 12-17.

Higgins, et al; "Emeraldine Base Polyaniline as an Alternative to Poly(3,4ethylenedioxythiophene) as a Hole-Transporting Layer," Adv. Funct. Mater. 11, No. 6, 2001. p. 407-412.

Pomerantz, et al, Poly(2-decylthieno(3,4-b)thiophene-4,6-diyl). A New Low Band Gas Conducting Polymer,: Macromolecules, 45, 2001, p. 1817-1822.

Lee, et al, "Poly(thieno{3,4-b}. A New Stable Low Band Gap Conducting Polymer," Macromolecules, 34, 2001, p. 5746-5747.

Sotzing, et al, "Poly(thieno{3,4-b}thiophene): A p- and n-Dopable Polythiophene Exhibiting High Optical Transparency in the Semiconducting State," Macromolecules, 35, 2002, p. 7281-7286.

Sotzing, et al, "Poly(thieno{3,4-b}thiophene) as a Low Bank Gap Conducting Polymer and Electrochromic Material," Polymer Materials, Science and Engineering 85, 2001, p. 604-605.

Jiang, et al, "Perfluorocyclobutane-Based Arylamine Hole-Transporting Materials for Organic and Polymer Light-Emitting Diodes," Advanced Functonal Materials, 12, 2002, p. 745-751.

Lee, et al, "Aqueous Phase Polymerization of Thieno{3,4-b}Thiophene," Polymer Preprints, 43 (2), 2002, p. 568-569.

Lee, et al, "Thieno{3,4-b}thiophene as a Novel Low Oxidation Crosslinking Agent," Polymeric Materials, Science & Engineering, 86, 2002, p. 195.

Jang, et al; "An Electrochemical Artificial Tongue Utilizing Intrinsically Conductive Polymers," Polymeric Materials: Science & Engineerng 86, 152, 2002, p. 152.

Rusling, et al "Sensor Applications of Layered Films of Sulfonated Polyaniline and Redox Proteins," Polymeric Materials: Science & Engineering, 86, 2002, p. 19.

Yu, et al, "Design and Characterization of Films of Sulfonated Polyaniline and Redox Proteins for Sensors," Polymeric Materials: Science & Engineering, 86, 2002, p. 269.

Yu, et al, "Wiring of Enzymes to Electrodes by Ultrathin Conductive Polyion Underlayers: Enhanced Catalytic Response to Hydrogen Peroxide," Anal. Chem, 75, 2003, p. 4565-4571.

Jang, et al, "Poly (Terthiophene) Networks via Electrochemical Crosslinking of Terthiophene Derivatized Norbornylene Monomers and Polymers," Polymeric Materials: Science & Engineering, 86, 2002, p. 205-206.

Sotzing, et al, Oxidative Solid-State Crosslinking of Polymer Precursors to Pattern Intrinsically Conducting Polymers, Polymeric Materials: Science & Engineering, 87, 2002, p. 371-272.

Jang, et al, "Intrinsically Conducting Polymer Networks of Poly(thiophene) via Solid-State Oxidative Cross-Linking of a Poly(norbornylene) containing Terthiophene Moieties," Macromoleules 35, 2002, p. 7293-7300.

Wang, et al, "Conductive Polymer Foams as Sensors for Volatile Amines," Chem Mater. 15, 2003, p. 375-377.

Albert, et al, "Cross-Reactive Chemical Sensor Arrays," Chem Rev. 100, 2000, p. 2595-2626.

* cited by examiner

US 8,920,678 B2

DISPERSIONS AND FILMS COMPRISING CONDUCTING POLYMER FOR OPTOELECTRONIC DEVICES

CROSS-REFERENCE TO RELATED APPLICATIONS

This application is a continuation of Sl. No. 10/755,426 filed Jan. 12, 2004, now U.S. Pat. No. 7,270,871.

BACKGROUND OF THE INVENTION

The invention relates to films, dispersions and optoelectronic devices comprising conducting polymer.

Optoelectronic devices are devices characterized by the interconversion of light and electricity. Optoelectronic devices either produce light or use light in their operation. Examples of optoelectronic devices include electroluminescent assemblies (e.g. light emitting diodes), laser diode and photovoltaic assemblies (e.g. photodiodes, photodetector and solar cells).

Electroluminescence is nonthermal conversion of electrical energy into light. An electroluminescent ("EL") assembly is characterized by the emission of light and the flow of electric current when an electric potential (or voltage) is applied. Such assemblies include light emitting diodes ("LEDs"), which are injection type devices. Organic LEDs (OLEDs) comprise organic semiconductors, such as conjugated low molecular weight molecules (small molecules) and high molecular weight polymers.

Organic semiconductors, especially conjugated polymers, combine the optical and electrical properties of inorganic semiconductors and the mechanical strength, such as flexibility, of plastics. Therefore, OLEDs have many advantages over other competing technologies and can be used in many different applications. For example, OLEDs can be used in information displays and general lighting applications.

A photovoltaic (PV) device absorbs light and generates electricity. The absorption of light and separation of charges happen in the active materials in a PV device. Organic materials such as conjugated polymers and small molecules can be used as the active materials in PV devices. Organic material based PV devices offer a potentially cheaper alternative over the traditional silicon based photovoltaic devices, such as solar cells and photodetectors.

A simple OLED comprises electroluminescent or light emitting organic material(s) sandwiched between two electrodes (J. H. Burroughes et al, Nature 347, 539 (1990)), one of which (frequently anode) is transparent to allow light to be extracted from the device and used for display or lighting. When the device is connected to an external voltage/current source, holes are injected from the anode and electrons injected from the cathode into the light emitting layer. The holes and electrons then migrate towards the opposite electrode under the influence of the applied electric field. In the recombination zone in the organic layer, holes and electrons encounter each other. A fraction of them recombine and form excitons or excited states. Some of the excitons then decay radiatively to the ground state by spontaneous emission and emit light. To improve the device performance, additional layers that can help inject/transport holes/electrons into the organic layer can be added. (C. W. Tang et al., Appl. Phys. Lett. 51, 913 (1987); P. K. H. Ho, et al., Nature 404, 481 (1998)).

The multilayer device configuration offers the advantage of being able to optimize the properties of the materials used for each layer, and adjust the layer thickness according to the property of the materials. However, the cost associated with manufacturing increases commensurately with the number of layers. With device design for manufacturability as a guide, a two-layer design becomes the minimum number of layers that provides anode-ion buffering and charge-carrier transport differentiation (M. T. Bernius et al., Adv. Mater. 12, 1737 (2000)). In a double layer device, each layer has multiple functions, e.g. charge injection/transport or charge transport/emission.

For hole injection/transport layer applications, a number of semiconductive materials have been demonstrated in the prior art. Poly(N-vinylcarbazole) (PVK) has been used as hole transport layer in small molecule OLEDs (X. Z. Jiang et al., Synth. Met. 87, 175 (1997)). Aromatic amines have been used as hole transporting layer (C. W. Tang et al., Appl. Phys. Lett. 51, 913 (1987)). A series of triarylamine containing perfluorocyclobutanes (PFCBs) that are in-situ thermally polymerized have been reported as hole injection/transport layer in OLEDs. The highest occupied molecular orbital (HOMO) level of the PFCBs ranges from $-5.1$ to $-5.3$ eV, which matches well with the work function of indium tin oxide (ITO), a commonly used anode for LEDs. Once polymerized, the PFCBs are insoluble in most organic solvent, which enables the fabrication of multilayer LEDs (X. Z. Jiang et al., Adv. Funct. Mater. 12, 745 (2002)). Using a high glass transition temperature ($T_g$) hole transport polymer with triphenyldiamine as the side chain, an OLED with a luminous efficiency of 20 Im/W and an external quantum efficiency of 4.6% at 14 cd/m$^2$ has been achieved. The device quantum efficiency can be increased by tuning the ionization potential of the hole transport moieties (G. E. Jabbour et al. IEEE Journal of Quantum Electronics 36 (1), 12 (2000)).

Conducting polymers have also been utilized as hole injection/transport material in OLEDs. Yang et al. disclosed the use of polyaniline (PANI) or a combination of PANI and ITO as the transparent anode of a polymer LED with poly[2-methoxy-5-(2'-ethyl-hexyloxy)-1,4-phenylene vinylene] (MEH-PPV), as the active layer (Y. Yang et al., Appl. Phys. Lett. 64, 1245 (1994)). Poly(3,4-ethylenedioxythiophene) (PEDOT) has been used to facilitate hole injection/transport (U.S. Pat. No. 6,391,481). Higgins et al disclosed an emeraldine base PANI protonated with polystyrene sulfonic acid as hole transport layer (R. W. T. Higgins et al., Adv. Funct. Mater. 11(6), 407 (2001)).

OLEDs represent a promising technology for large, flexible, lightweight, flat-panel displays. However, the OLED devices need further improvement for practical applications. Similarly, the performance of organic photovoltaic devices needs further enhancement for practical applications.

BRIEF SUMMARY OF THE INVENTION

The current invention is a film comprising conducting polymer applied from a dispersion containing particles having a particle size of less than 450 nm, wherein the conducting polymer comprises substituted or unsubstituted, uncharged or charged polymerized units of thieno[3,4-b]thiophene, and wherein a film has a conductivity between from $10^{-1}$ to $10^{-6}$ S/cm, or from $10^{-2}$ to $10^{-6}$ S/cm, or from $10^{-2}$ to $10^{-5}$ S/cm when measured from a drop-cast film of the dispersion using the four point probe method. The film is particularly useful as a hole injection layer, a hole transport layer or a combined hole injection and hole transport layer in an optoelectronic device.

The film comprising polymerized units of thieno[3,4-b]thiophene can be applied from a dispersion that contains particles, even in a swollen state, having a particle size of less than 450 nm, or less than 200 nm.

The invention provides a dispersion comprising conducting polymer containing particles having a particle size of less than 450 nm, wherein the conducting polymer comprises substituted or unsubstituted, uncharged or charged polymerized units of thieno[3,4-b]thiophene, and wherein a film drop cast from the dispersion has a conductivity from $10^{-1}$ to $10^{-6}$ S/cm measured using the four point probe method.

When a film comprising polymerized units of thieno[3,4-b]thiophene is used as a hole injection layer, hole transport layer, or hole injection/transport layer for optoelectronic devices such as light emitting diodes or photovoltaic devices, the device performance can be improved. Optoelectronic devices comprising the film are also provided by this invention.

DETAILED DESCRIPTION OF THE INVENTION

One embodiment of the invention is a film comprising conducting polymer applied from a dispersion containing particles having a particle size of less than 450 nm, wherein the conducting polymer comprises substituted or unsubstituted, uncharged or charged polymerized units of thieno[3,4-b]thiophene, and wherein the film has a conductivity between $10^{-1}$ to $10^{-6}$ S/cm. The film is particularly useful as a hole injection layer, a hole transport layer or a combined hole injection and hole transport layer. The film is particularly useful in an optoelectronic device that is capable of the interconversion of light and electricity.

The term dispersion is used herein to describe a system consisting of a disperse phase in a medium. It can be a dispersion, a solution, a colloid, an emulsion or the like. In this invention, the term dispersion is used herein to describe the material used to form the film comprising the conducting polymer. It is understood that the material used to form the film may be a dispersion, a solution, a colloidal, an emulsion, or the like.

The term film, used herein, shall possess a broad definition encompassing any coating or deposit of the films of the present invention regardless of thickness, shape or structure. In certain embodiments, the thickness is at least 5 nm. Films can be formed by depositing a monomolecular layer of the composition. Several layers of the same or different compositions are also contemplated herein.

It has been found that the thieno[3,4-b]thiophenes of this invention polymerize at high polymerization rates in the presence of polyanions, and form stable compositions preferably in solvent having the desired properties for optoelectronic applications. Water, or organic solvents, such as, lower alcohols like methanol, ethanol, butanol or isopropanol as well as mixtures of water with said lower alcohols or with other water-miscible organic solvents like acetone are suitable as solvents for the compositions. The preferred solvents are water, or a water/alcohol mixture. The term aqueous medium will be used herein to refer to the solvent when it includes water or a mixture of water and one or more organic solvents used in the dispersions.

The average particle diameter of the particles of the dispersions is less than 450 nm, preferably less than 200 nm.

Accordingly, the present invention relates to dispersions of polymers in the presence of polyanions, wherein the polymers comprise structural units corresponding to the following formula (I):

(I)

where R is hydrogen, substituted or unsubstituted $(C_1-C_{18})$-alkyl, preferably $(C_1-C_{10})$-alkyl, in particular $(C_1-C_6)$-alkyl, for example, t-butyl, $(C_3-C_7)$-cycloalkyl, $(C_1-C_{18})$-alkyloxy, preferably $(C_1-C_{10})$-alkyloxy, or $(C_2-C_{18})$-alkyloxy ester, phenyl and substituted phenyl, and $SF_5$.

Suitable conductive polymers which may be used in accordance with the present invention include undoped or doped, soluble or insoluble thieno[3,4-b]thiophene based polymers comprising units of the formula (I), such as, the polymer shown in formula (II)

(II)

where n represents an integer from 3 to 100 and

R is hydrogen, substituted or unsubstituted $(C_1-C_{18})$-alkyl, preferably $(C_1-C_{10})$-alkyl, in particular $(C_1-C_6)$-alkyl, for example, t-butyl, $(C_3-C_7)$-cycloalkyl, $(C_1-C_{18})$-alkyloxy, preferably $(C_1-C_{10})$-alkyloxy, or $(C_2-C_{18})$-alkyloxy ester, phenyl and substituted phenyl, and $SF_5$. When R=H, a crosslinking structure is possible through the R-linked carbon site. The term poly(thieno[3,4-b]thiophene) will be used to refer to homopolymers or copolymers comprising structural units corresponding to formula (I).

The polyanions are anions of polymeric carboxylic acids, such as polyacrylic acids, polymethacrylic acids or polymaleic acids, and polymeric sulfonic acids, such as polystyrene sulfonic acids and polyvinyl sulfonic acids. These polycarboxylic and polysulfonic acids may also be copolymers of vinyl carboxylic and vinyl sulfonic acids with other polymerizable monomers, such as acrylates and styrene.

The molecular weight of the polyacids supplying the polyanions is preferably in the range form 1,000 to 1,500,000, more preferably in the range from 2,000 to 300,000, most preferably from 20,000 to 260,000. The polyanions can also be supplied by alkali salts of the polyacids. The polyacids or their alkali salts are commercially available, for example polystyrene sulfonic acids and polyacrylic acids, or may be produced by known methods.

The dispersions comprising conducting polymer in the presence of polyanions according to the invention are obtained by oxidative polymerization of units corresponding to formula (I), with oxidizing agents typically used for the oxidative polymerization of pyrrole and/or with oxygen or air in the presence of the polyacids, preferably in aqueous medium, at temperatures from 4° C. to 50° C., preferably from 8° C. to 22° C., more preferably from 8° C. to 18° C.

For polymerization, the monomers corresponding to formula (I), polyanion(s) and oxidizing agent(s), and other optional components are dissolved or dispersed in an organic solvent, or preferably, in an aqueous medium and the resulting reaction mixture is stirred at the desired polymerization temperature. Where air or oxygen is used as the oxidizing agent, air or oxygen is introduced into the reaction mixture containing the monomers of formula (I), polyacid and, optionally, catalytic quantities of metal salts or other components during the whole polymerization period.

The reaction mixture may be mixed before and/or during the polymerization. Mixing can be accomplished by several means including mechanical means. Preferred mechanical mixing is high shear mixing. Presently, shear mixing from 5000 rpm to 24,000 rpm is preferred. The polymerization can be carried out from 10 minutes to 24 hours, preferably from 20 minutes to 4 hours. The time for polymerization of the reaction mixture will vary with the composition of the reaction mixture, the temperature and the rate of mixing. The stability of the obtained dispersions may be improved by the addition of dispersing agents like sodium dodecyl sulphonate during or after polymerization.

Suitable oxidizing agents are any of the oxidizing agents suitable for the oxidative polymerization of pyrrole which are described, for example, in J. Am. Soc. 85, 454 (1963). For practical reasons, it is preferred to use inexpensive and easy-to-handle oxidizing agents, for example iron(III) salts, such as $FeCl_3$, $Fe(ClO_4)_3$, $Fe_2(SO_4)_3$, and the iron(III) salts of organic acids and inorganic acids containing organic residues, as well as $H_2O_2$, $K_2Cr_2O_7$, alkali or ammonium persulfates, alkali perborates, potassium permanganate and copper salts, such as copper tetrafluoroborate. In addition, it has been found that air and oxygen, optionally in the presence of catalytic quantities of metal ions, such as iron, cobalt, nickel, molybdenum and vanadium ions, may advantageously be used as oxidizing agents.

The use of the persulfates and the iron(III) salts of organic acids and inorganic acids containing organic residues has the major applicational advantage that they are not corrosive.

Examples of iron(II) salts of inorganic acids containing organic residues are the iron(III) salts of sulfuric acid semiesters of $C_{1-20}$ alkanols, for example, the Fe(III) salt of lauryl sulfate.

Examples of iron(III) salts of organic acids are: the Fe(III) salts of $C_{1-30}$ alkyl sulfonic acids, such as methane or dodecane sulfonic acid; aliphatic $C_{1-20}$ carboxylic acids, such as 2-ethylhexyl carboxylic acid; aliphatic perfluorocarboxylic acids, such as trifluoroacetic acid and perfluorooctanoic acid; aliphatic dicarboxylic acids, such as oxalic acid and aromatic, optionally $C_{1-20}$-alkyl-substituted sulfonic acids, such as benzenesulfonic acid, p-toluenesulfonic acid and dodecyl benzenesulfonic acid.

Mixtures of the above-mentioned Fe(III) salts of organic acids may also be used.

Theoretically, 2 equivalents of oxidizing agent per mol monomer of the formula (I) are required for the oxidative polymerization. In practice, however, the oxidizing agent is used in certain excess, for example in an excess of 0.1 to 2 equivalents per mol monomer.

In the oxidative polymerization reaction, the polyanion to be used in accordance with the invention are added in such a quantity that, for every mol monomer corresponding to formula (I), there are 0.01 to 50 and preferably 0.1 to 30 mol anion groups of the polyanion.

For the oxidative polymerization, the monomers corresponding to formula (I) and the polyanion(s) are dissolved in such a quantity of solvent that stable poly(thieno[3,4-b] thiophene) dispersions are obtained having solid contents of 0.05 to 50% by weight and preferably 0.5 to 5% by weight.

To obtain films having before adhesion to the substrate, polymeric binder soluble or suspendable in water, for example polyvinyl alcohol or polyvinyl acetate dispersions, may also be added to the dispersion. Ammonia or amines may be added to neutralize the dispersion after polymerization. After the polymerization, solvents or cosolvents or additives, such as, surfactant may also be added to the dispersion.

The polyanion(s) may be added to the reaction mixture prior to polymerization or may be added to the dispersion after polymerization. Dispersions may be obtained with less than 0.5 part by weight of the conducting polymer comprising units of formula (I) based on one part by weight of the polyanion(s).

The dispersions used to form the films of this invention may comprise copolymers, comprising units of thieno[3,4-b] thiophene, and units of other monomers The monomers useful for forming copolymers include monomers known to form conducting polymers through oxidative polymerization, particularly other thiophene monomers. Examples of useful monomers used to form conducting polymers that can be added to the dispersions are disclosed in U.S. Pat. No. 5,300,575, and U.S. Pat. No. 4,959,430 incorporated herein by reference. Monomers used to form other known conducting polymers can be added to the reaction mixture used to form the dispersion prior to or during the polymerization. The total amount of monomers including the monomers of formula (I) added to the reaction mixture may be from 0.01 to 30% by weight based on the total weight of the dispersion.

Preferred dispersions of the conducting polymers contain less than 10 ppm of metal ions and/or less than 10 ppm of anions of inorganic acids. Particularly preferred are dispersions of the conducting polymers that contain less than 1 ppm of metal ions and/or less than 1 ppm of anions of inorganic acids.

It is also possible to add electrically inert organic polymers and/or organic low molecular weight crosslinking agent to the dispersions comprising the conducting polymer to adjust the conductivity, and film-forming properties.

As shown by the examples herein, the particle size of the dispersions and the conductivity of films prepared from the dispersions can be adjusted by the composition and the process of preparation of the dispersions (for example, by adjusting the temperature, shear rate, and reaction times). This is important for optoelectronics, e.g. matrix display, particularly for passive matrix display, because crosstalk between neighboring pixels might occur due to low surface resistance of the films. In this respect, the conductivity of the film can be optimized for the desired film thickness to yield a film that has a surface resistance necessary to suppress crosstalk.

Figure 1:
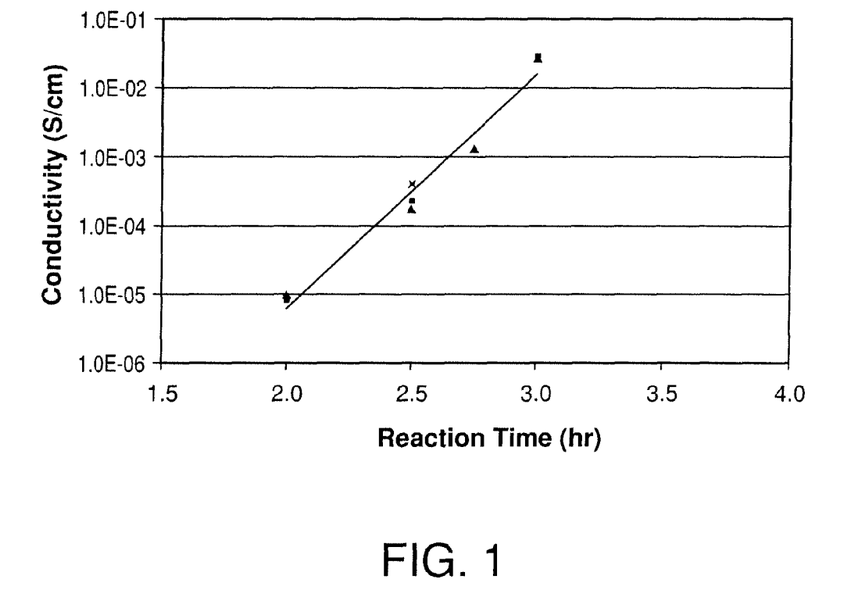
FIG. 1 is a graph showing the relationship between the reaction time at 9° C. to form a dispersion, and the conductivity of the film drop cast from the dispersion.

The inventors have discovered that there is a relationship between the polymerization reaction time and the conductivity of films cast from the resulting dispersion for a given reaction temperature of the dispersion. FIG. 1 is a graph showing the relationship between the measured drop cast film conductivity (measured from a drop cast film in an argon glove box using the four point probe method) and the polymerization reaction time for a reaction mixture at 9° C. used to form a dispersion and film in accordance with this invention. At higher polymerization temperatures shorter reaction times would be required to obtain conductivities from $10^{-1}$ to $10^{-6}$ S/cm. At polymerization temperatures less than 9° C., longer reaction times would be required to obtain conductivities from $10^{-1}$ to $10^{-6}$ S/cm. The oxidative polymerizations of thieno[3,4-b]thiophene in the presence of polyanions can be carried out over a range of polymerization reaction times and temperatures. Preferred polymerization temperatures are from 7° C., to about room temperature (22° C.). More preferred polymerization temperatures are from 8° C. to 18° C.

It also has been found that by controlling the polymerization temperatures and polymerization reaction times not only the conductivity of the doped conducting polymer can be altered but also the filterability of the aqueous dispersions produced from the oxidative polymerization. The aqueous dispersions produced between 8° C. and 18° C. can be filtered through a 450 nm pore size filter and a 200 nm pore size filter. Any reference to a filter size herein means the pore size of the filter unless otherwise indicated. Filterability denotes a small particle size which is important in producing uniform (smooth) films made by spin casting of the aqueous dispersion of the doped conducting polymer.

The dispersions of the conducting polymer are preferably filtered through a filter having a pore size less than or equal to 450 nm before the dispersions are used to form films, e.g. by coating onto substrates or other articles. Preferably, the solutions or dispersions are filtered using filters with pore size less than or equal to 200 nm before the dispersions are used to form films.

The films of this invention are typically applied to an article. The film application or fabrication methods include but are not limited to spin coating, doctor blade coating, ink jet printing, screen printing, thermal transfer printing, microcontact printing or digital printing. Thickness of the film can range from 2 nm to 1000 nm, preferably from 20 nm to 500 nm, or more preferably from 50 nm to 200 nm. After the film is deposited from the dispersion, the film may be heated at a temperature from 50° C. to 250° C., preferably from 100° C. to 200° C. to remove the residual solvent, or other volatiles preferably in an inert atmosphere.

The films of this invention are useful as a layer in an optoelectronic device. The film can be used to form the hole injection layer, hole transport layer or combined hole injection and hole transport layer (which may be referred to hereinafter as a "hole injection/transport layer") in an optoelectronic device. Examples of optoelectronic devices include light emitting diodes and photovoltaic devices.

Figure 2:
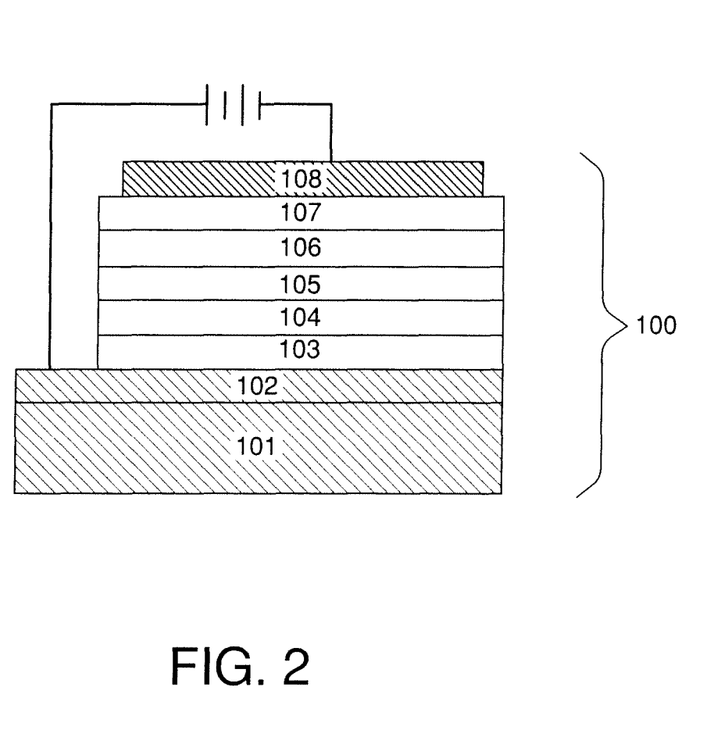
FIG. 2 is a schematic showing the layers in one embodiment of an organic light emitting diode (OLED).

A multiple-layered LED structure is shown in FIG. 2. (As mentioned before, an LED 100 may be formed with a light emitting layer between two electrodes, in which the light emitting layer assumes a plurality of functions.) The LED shown in FIG. 2 has a substrate 101, anode 102, hole injection layer 103, hole transport layer 104, light emitting layer 105, electron transport layer 106, electron injection layer 107, and cathode 108. When making display or lighting devices, at least one of the anode 102 and the cathode 108 is transparent. Since the device is sensitive to moisture/oxygen, the device is normally hermetically encapsulated for different applications. The LED shown in FIG. 2 is one embodiment. Alternative embodiments may consist of fewer or more layers. If there are fewer individual layers, at least one of the remaining layers assumes a plurality of functions.

Suitable materials for the substrate 101 which may be considered a layer of the device, include glass, metal foil, plastics such as poly(ethylene terephthalate), poly(ethylene naphthalate), polyester, polysulfone, polyimide, polycarbonate, polyacrylate, polyarylate, and the like. The substrate 101 will be transparent if the light is to be extracted from the device through the anode 102 in the embodiment shown in FIG. 2. In the case of light being extracted through the cathode 108, a transparent cathode is used and a non-transparent substrate such as metal foil, can be used as the substrate 101. An encapsulation layer (not shown) is typically provided to seal the LED. If the encapsulation layer covers the layer from which light is emitted or extracted, it is preferably a transparent layer. Useful materials, such as glass and metal plates for the encapsulation layer are known in the art.

Suitable anode materials for anode 102 include metal oxides such as tin oxide, ITO, zinc oxide, doped zinc oxide, a semitransparent thin film of metals such as Au, Pt, Cu, and Ag, etc., or conductive polymers such as polyaniline, poly(3,4-ethylenedioxythiophene) (PEDOT), U.S. Pat. No. 5,766,515, and U.S. Pat. No. 6,083,635, polythiophene, polypyrrole, and the like.

The cathode 108 can be a material containing any metal or nonmetal capable of injecting electrons into the light emitting layer. The cathode normally has a lower work function than the anode material. Suitable materials for the cathode 108 are low work function metals such as aluminum, indium, calcium, barium, magnesium, silver, lithium, or the like, alloy such as Mg:Ag, and a combination of salts and metals, such as, LiF/Al, NaCl/Al, or LiF/Ca/Al, or the like. Semitransparent cathodes, such as, very thin layers of the above mentioned metals in combination with ITO, can be used to fabricate OLEDs that emit light through the cathode. The cathode layer is usually applied by a physical vapor deposition process such as thermal deposition, plasma deposition, e-beam deposition, or sputtering.

The light-emitting layer 105 may contain any organic electroluminescent material. Suitable materials for the light emitting layer include polymeric materials such as those described in U.S. Pat. No. 5,247,190 (to Friend et al.), U.S. Pat. No. 5,408,109 (to Heeger et al.), U.S. Pat. No. 5,962,631 (to Woo et al.), which are incorporated herein by reference, poly(phenylene vinylene)s, such as, poly(2-methoxy, 5-(2'-ethyl-hexyloxy)-p-phenylene-vinylene) (MEH-PPV) and Covion's Super Yellow, polyfluorenes, such as, poly(9,9-dialkyl fluorene), poly(9,9-dialkyl fluorene)-co-2,1,3-benzothiadiazole, poly(9,9-diakylfluorene)-co-2,1,3-benzothiadiazole-co-thiophene, poly(para-phenylene), spiro-polyfluorenes, and the like; small molecules, such as, 8-hydroxyquinoline aluminum ($Alq_3$), laser dyes, europium complex, and dendrimers, (J. M. Lupton et al., Adv. Mater. 13(4), 258 (2001)) and those described in, for example, U.S. Pat. No. 4,356,429 to Tang et al., incorporated herein by reference. Phosphorescent compounds, e. g., platinum octaethyl porphyrin (PtOEP), bis(2-(2'-benzothienyl)pyridinato-N,$C^{3'}$)acetylacetonate) Iridium (III), and tris(2-(4-tolyl)phenylpyridine) Iridium (III), which can utilize triplet excitons, and hence yield higher efficiency, can also be used for the light emitting layer 105. A blend or mixture of two or more small molecule or polymer light emitting materials can also be used. The small molecules can also be doped into or blended with polymers.

The light-emitting materials may be dispersed in a matrix of other material(s). The light-emitting layer generally has a thickness of 40 to 400 nm.

The light emitting layer can be applied (onto the hole transport layer, hole injection layer or hole injection/transport layer) from solutions by any casting method, such as, spin-coating, ink-jet printing, screen printing, or digital printing. The light emitting layer can also be applied by a thermal transfer process. In the case of small molecules, the layer can be applied by thermal evaporation, or low pressure organic vapor phase deposition.

The film of this invention can be used as either the hole injection layer (HIL) 103 or hole transport layer (HTL) 104 or can be used to replace the HIL 103 and HTL 104 as shown in FIG. 2 with a single hole injection/transport layer (not shown). The film of this invention when used as a hole injection/transport layer in one embodiment forms a clear interface between the anode layer 102 and the light emitting layer 105. In the preferred embodiments described herein, the film of this invention is used as both the HIL and HTL in the LED; however, the film could be used in an LED as the HIL with a separate and/or different HTL therein, or the film could be used in an LED as the HTL with a separate and/or different HIL therein. In alternative embodiments, an electron blocking layer can be inserted between the light emitting layer and the HIL or HTL (either or both of which may comprise films of this invention) to prevent electrons from reaching one or both of those layers.

Since the film of this invention may have a more favorable work function compared with commonly used anode material ITO, the film may improve the injection of holes within the LED devices. The film of this invention may also have a higher conductivity compared with the light emitting polymer layer; therefore, it may also function as a hole transport layer. Furthermore, the film of this invention may act as a buffer layer, because the electric field in the film may be lower than in the light emitting layer, which will slow down the diffusion of ions such as $In^{3+}$.

Figure 3:
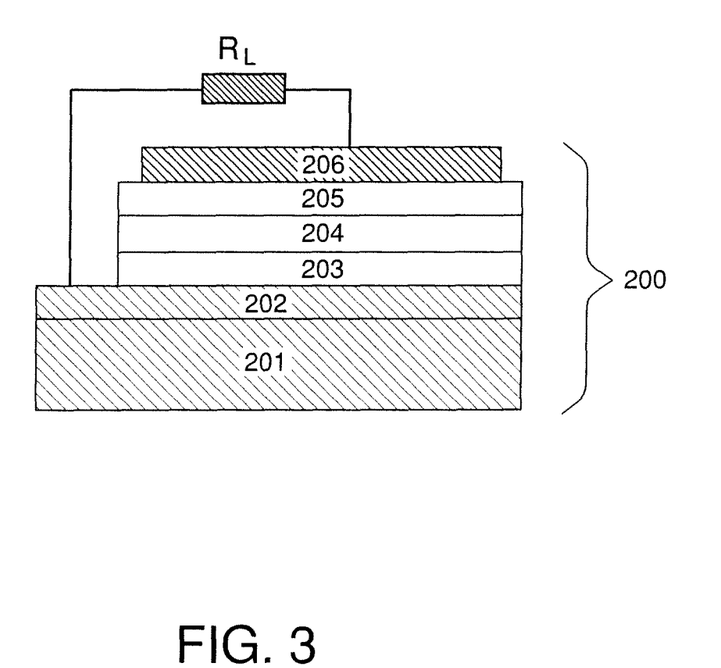
FIG. 3 is a schematic showing the layers of one embodiment of a photovoltaic (PV) device.

A photovoltaic (PV) device is a device that absorbs light and generates electricity. FIG. 3 shows the structure of one embodiment of a PV device, comprising substrate 201, anode 202, hole transporting layer 203, semiconductive hole transporting layer 204, semiconductive electron transporting layer 205, and cathode 206. Alternative embodiments of PV devices may have fewer or more layers than are shown in FIG. 3. In the case of a bulk heterojunction PV device, layers 204 and 205 can be substituted with a layer of interpenetrating network of the semiconductive hole transporting and electron transporting materials to increase the interfacial area where charge separation takes place.

For a PV, the substrate 201, the anode 202, and the cathode 206, can be the same materials as those described for the substrate 101, the anode 102, and the cathode 108 for the LED above, respectively. The hole transport layer 203 can comprise the film of this invention.

The semiconductive hole transporting layer 204 may be made of small molecules or polymers having hole transporting properties, such as MEH-PPV (G. Yu et al., J. of Electronic Materials 23, 925(1994)), phthalocyanine, and aryl amines.

The semiconductive electron transporting layer 205 may be made of small molecules or polymers having electron transporting properties, such as CN-PPV (J. J. M. Halls et al. Nature 376, 498, 1995), N,N'-bis(2,5-di-tert-butylphenyl-3,4,9,10-perylenedicarboximide, and perylene-3,4,9,10-tetracarboxylic-4,4,9,10-dianhydride (PTCDA). The combination of semiconductive hole transporting material and electron transporting material should be selected based on their HOMO and LUMO energy level alignment, such that charge separation from excitons generated in one or both of the materials will be facilitated at the interface of the two materials.

The light emitting diode or photovoltaic devices of the invention can be produced by the methods disclosed in the prior art, known to a person of skill in the art or as described in the examples below.

EXAMPLES

Example 1

Poly(thieno[3,4-b]thiophene):poly(styrene sulfonic acid) (PTT) Dispersion Prepared at Room Temperature, Film, and OLED (Comparative Example)

0.051 g (0.364 mmol) of thieno[3,4-b]thiophene and 0.424 g of 70,000 Mw (weight average molecular weight) poly (styrenesulfonic acid) solution, 30 wt % in water, was added to a 10 mL two neck flask. 9.79 g of de-ionized water was added before stirring with a teflon stir bar at approximately 200 rpm. Polymerization was caused by 0.160 g of ferric sulfate hydrate added to the reaction flask while maintaining stirring. The reaction was carried out for 24 hours at 22° C. before the mixture was purified by passing sequentially through 5 g of Amberlite IR-120 and 5 g IRA-900 ion exchange resins, resulting in a deep green-blue aqueous PTT dispersion. The dispersion is hereafter referred to as Dispersion 1. Dispersion 1 was not filterable with a 450 nm filter. A thin film was prepared by drop cast 0.5 mL of Dispersion 1 onto 1"×1" glass substrate. The film was dried in air and annealed at 160° C. for 30 minutes under nitrogen protection. The conductivity of the film was $1.60 \times 10^{-3}$ S/cm, measured by four point probe method in an argon filled glove box.

A light emitting polymer solution of MEH-PPV, (ADS130RE from American Dye Source, Inc.) in toluene was prepared by dissolving 25.6 mg of MEH-PPV in 4.25 g of toluene and then filtered with a 1000 nm PVDF (Polyvinylidene fluoride) filter. The solution is hereafter referred to as Solution A. An ITO coated glass substrate (2.5×2.5×0.7 cm, surface resistance ~12 Ω/square) was cleaned by ultrasonication sequentially in detergent, de-ionized water, methanol, isopropanol, and acetone; each for 5 to 10 minutes. The ITO substrate was allowed to dry between different cleaning solvents. Then the ITO substrate was treated with oxygen plasma in an SPI Prep II plasma etcher for about 10 minutes. After that, the ITO substrate was spin coated with Dispersion 1 at 800 rpm for 2 minutes followed by 2000 rpm for 20 seconds on a Laurell Model WS-400-N6PP spinner to form the HIL. Since Dispersion 1 was not filterable, it was used without filtration. The thickness of the PTT layer was about 30 nm. The PTT coated ITO substrate was then annealed at 180° C. for 15 minutes under nitrogen protection. Then a layer of about 70-nm-thick MEH-PPV was spin coated onto the HIL from Solution A at a spin rate of 1500 rpm. The sample was then transferred into the chamber of a vacuum evaporator, which was located inside an argon atmosphere glove box. A layer of 20 nm thick Ca was vacuum deposited at below $1 \times 10^{-7}$ Torr through a mask at a rate of 1.5~2.0 Å/s, and another layer of 100 nm thick Ag was vacuum deposited on top of Ca as a protecting layer. The active area of the device was about 6.2 $mm^2$. The LED device was then moved out of the glove box for testing in air at room temperature. Thicknesses were measured on a KLA Tencor P-15 Profiler. Current-voltage characteristics were measured on a Keithley 2400 SourceMeter. Electroluminescence (EL) spectrum of the device was measured using an Oriel InstaSpec IV CCD camera. The power of EL emission was measured using a Newport 2835-C multi-function optical meter in conjunction with a calibrated Si photodiode. Brightness was calculated using the EL forward output power and the EL spectrum of the device, assuming Lambertian distribution of the EL emission. The device showed very high leakage current and poor performance. The device reached 1 cd/m$^2$ at 4 V, with a maximum external quantum efficiency of only 0.16%. At a current density of 100 mA/cm$^2$, the device showed a brightness of only 150 cd/m$^2$. At a current density of 1000 mA/cm$^2$, the brightness was only 2000 cd/m$^2$.

Example 2

PTT Dispersion Prepared at Room Temperature with High Shear Mixing, Film, and OLED Using a 350 mL jacketed Florence flask, 3.5 g of 244,000 Mw poly(styrenesulfonic acid) was dissolved in situ in approximately 30 ml of distilled water. 0.98 g (6.99 mmol) of thieno[3,4-b]thiophene was added to the flask followed by sufficient distilled water to make up a 350 gram reaction mass. Stirring was accomplished using an IKA Turrax T-25 rotor stator at 11,000 rpm. Polymerization was caused by 3.37 g of ferric sulfate hydrate added to the reaction flask while maintaining stirring. Reaction was carried out for 2 hours at 27° C. Temperature was maintained using a thermostated recirculating fluid through the jacketed portion of the reaction flask. The reaction mixture was purified by passing sequentially through 17.5 g of Amberlite IR-120 and 17.5 g IRA-900 ion exchange resins, resulting in a deep green-blue aqueous PTT dispersion. The dispersion is hereafter referred to as Dispersion 2. Dispersion 2 was filterable with a 450 nm filter. A thin film of Dispersion 2 was prepared and the conductivity of the film measured the same way as in Example 1. The conductivity was 8.94×10$^{-3}$ S/cm.

An OLED device was fabricated and tested in the same way as Example 1 except that Dispersion 2 was used to spin coat the HIL. Dispersion 2 was filtered with a 450 nm PVDF filter before spin coating. The thickness of the PTT layer was about 30 nm. The device reached 1 cd/m$^2$ at 2.6 V, with a maximum external quantum efficiency of 0.55%. At a current density of 100 mA/cm$^2$, the device showed a brightness of 850 cd/m$^2$. At a current density of 1000 mA/cm$^2$, the brightness was 7,900 cd/m$^2$. The device showed relatively high leakage current.

Example 3

PTT Dispersion Prepared at Room Temperature with High Shear Mixing, Film and OLED 0.51 g (3.64 mmol) of thieno[3,4-b]thiophene and 4.33 g of 70,000 Mw poly(styrenesulfonic acid) solution, 30 wt % in water, was added to a 100 mL jacketed two neck flask. Sufficient distilled water to make up a 100 gram reaction mass was added before stirring with an IKA Turrax T8 rotor stator at 12,000 rpm. Polymerization was caused by 1.72 g of ferric sulfate hydrate added to the reaction flask while maintaining stirring. Reaction was carried out for 1 hour at 22° C. Temperature was maintained using a thermostated recirculating fluid through the jacketed portion of the reaction flask. The reaction mixture was purified by passing sequentially through 15 g of Amberlite IR-120 and 15 g IRA-900 ion exchange resins. The resultant dispersion is hereafter referred to as Dispersion 3. Dispersion 3 was filterable with a 450 nm filter. A thin film of Dispersion 3 was prepared and the conductivity of the film measured the same way as in Example 1. The conductivity was 1.82×10$^{-2}$ S/cm.

An OLED device was fabricated and tested in the same way as Example 1 except that Dispersion 3 was used to spin coat the HIL. Dispersion 3 was filtered with a 450 nm PVDF filter before spin coating. The thickness of the PTT layer was about 30 nm. The device reached 1 cd/m$^2$ at 2.5 V, with a maximum external quantum efficiency of 0.55%. At a current density of 100 mA/cm$^2$, the device showed a brightness of 1,000 cd/m$^2$. At a current density of 1000 mA/cm$^2$, the brightness was 8,700 cd/m$^2$. The device also showed relatively high leakage current.

Example 4

PTT Dispersion Prepared at 4° C. with High Shear Mixing, Film and OLED 1.73 g (12.34 mmol) of thieno[3,4-b]thiophene and 15.1 g of 70,000 Mw poly(styrenesulfonic acid) solution, 30 wt % in water, was added to a 350 mL jacketed Florence flask. Sufficient distilled water to make up a 350 gram reaction mass was added before stirring with an IKA Turrax T25 rotor stator at 11,000 rpm. Polymerization was caused by 6.02 g of ferric sulfate hydrate added to the reaction flask while maintaining stirring. Reaction was carried out for 1 hour at 4° C. Temperature was maintained using a thermostated recirculating fluid through the jacketed portion of the reaction flask. The reaction mixture was purified by passing sequentially through 50 g of Amberlite IR-120 and 50 g IRA-900 ion exchange resins. The resultant dispersion is hereafter referred to as Dispersion 4. Dispersion 4 was filterable with a 200 nm filter. A thin film of Dispersion 4 was prepared and the conductivity of the film measured the same way as in Example 1. The conductivity was 1.64×10$^{-6}$ S/cm.

An OLED device was fabricated and tested in the same way as Example 1 except that Dispersion 4 was used to spin coat the HIL. Dispersion 4 was filtered with a 450 nm PVDF filter before spin coating. The thickness of the PTT layer was about 20 nm. The device reached 1 cd/m$^2$ at 2.5 V, with a maximum external quantum efficiency of 0.58%. At a current density of 100 mA/cm$^2$, the device showed a brightness of 830 cd/m$^2$. Due to the low conductivity of the PTT, the brightness of the device was limited. The maximum brightness of the device was 1,700 cvd/m$^2$ at a current density of 260 mA/cm$^2$ and 11 V.

Example 5

PTT Dispersion Prepared at 9° C. with High Shear Mixing, Film and OLED

A dispersion was prepared using the same procedure as in Example 4, except that the reaction was carried out for 2.5 hours at 9° C. The dispersion is hereafter referred to as Dispersion 5. Dispersion 5 was filterable with a 200 nm filter. A thin film was prepared using Dispersion 5 and the conductivity of the film measured the same way as in Example 1. The conductivity was 2.16×10$^{-3}$ S/cm.

An OLED device was fabricated and tested in the same way as Example 1 except that Dispersion 5 was used to spin coat the HIL. Dispersion 5 was filtered with a 450 nm PVDF filter before spin coating. The thickness of the PTT layer was about 30 nm. The device reached 1 cd/m$^2$ at 2.5 V, with a maximum external quantum efficiency of 0.77%. At a current density of 100 mA/cm², the device showed a brightness of 1,300 cd/m². At a current density of 1000 mA/cm², the brightness was 9,280 cd/m².

Example 6

PTT Dispersion Prepared at 9° C. with High Shear Mixing, Film and OLED

A dispersion was prepared using the same procedure as in Example 4, except that the reaction was carried out for 2.75 hours at 9° C. The dispersion is hereafter referred to as Dispersion 6. Dispersion 6 was filterable with a 200 nm filter. A thin film of Dispersion 6 was prepared and the conductivity of the film measured the same way as in Example 1. The conductivity was $9.27 \times 10^{-4}$ S/cm.

An OLED device was fabricated and tested in the same way as Example 1 except that Dispersion 6 was used to spin coat the HIL. Dispersion 6 was filtered with a 0.45 PVDF filter before spin coating. The thickness of the PTT layer was about 30 nm. The device reached 1 cd/m² at 2.3 V, with a maximum external quantum efficiency of 0.73%. At a current density of 100 mA/cm², the device showed a brightness of 1,440 cd/m². At a current density of 1000 mA/cm², the device showed a brightness of 11,550 cd/m².

Example 7

PTT Dispersion Prepared at 9° C. with High Shear Mixing, Film and OLED

A dispersion was prepared using the same procedure as in Example 4, except that 0.875 g (6.24 mmol) of thieno[3,4-b]thiophene was used and the reaction was carried out for 2.75 hours at 9° C. The dispersion is hereafter referred to as Dispersion 7. Dispersion 7 was filterable with a 200 nm filter. A thin film of Dispersion 7 was prepared and the conductivity of the film measured the same way as in Example 1. The conductivity was $3.24 \times 10^{-3}$ S/cm.

An OLED device was fabricated and tested in the same way as Example 1 except that Dispersion 7 was used to spin coat the HIL. Dispersion 7 was filtered with a 450 nm PVDF filter before spin coating. The device reached 1 cd/m² at 2.2 V, with a maximum external quantum efficiency of 0.76%. At a current density of 100 mA/cm², the device showed a brightness of 1,360 cd/m². At a current density of 1000 mA/cm², the brightness was 10,400 cd/m².

Example 8

PTT Dispersion Prepared at 9° C. with High Shear Mixing, Film and OLED

A dispersion was prepared following the same procedures as in Example 4, except that 3.5 g (24.96 mmol) of thieno[3,4-b]thiophene and 30.2 g of 70,000 Mw poly(styrenesulfonic acid) solution were used, 12.0 g of ferric sulfate hydrate was added, the reaction was carried out for 2.5 hour at 9 C, and the purification used 100 g of Amberlite IR-120 and 100 g of IRA-900 ion exchange resins. The dispersion is hereafter referred to as Dispersion 8. A thin film of Dispersion 8 was prepared and the conductivity of the film measured the same way as in Example 1. The conductivity was $2.32 \times 10^{-4}$ S/cm.

An LED device was fabricated and tested in the same way as in Example 1 except that Dispersion 8 was used to spin coat the HIL. Dispersion 8 was filtered with a 450 nm PVDF filter before spin coating. The thickness of the PTT layer was about 30 nm. The device reached 1 cd/m² at 2.1 V, with a maximum external quantum efficiency of 0.69%. At a current density of 100 mA/cm², the device showed a brightness of 1,330 cd/m². At a current density of 1000 mA/cm², the brightness was 9,070 cd/m².

Example 9

PTT Dispersion Prepared at 9° C. with High Shear, Film and OLED (Comparative Example)

A dispersion was prepared following the same procedures as in example 4, except that 0.46 g (3.28 mmol) of thieno[3,4-b]thiophene and 30.5 g of 70,000 Mw poly(styrenesulfonic acid) solution were used, 1.7 g of ferric sulfate hydrate was added, the reaction was carried for 3.5 hours at 9° C., and the purification used 15 g of Amberlite IR-120 and 15 g IRA-900 ion exchange resins. The dispersion is hereafter referred to as Dispersion 9. Dispersion 9 was filterable with a 200 nm filter. A thin film of Dispersion 9 was prepared and the conductivity of the film measured the same way as in Example 1. The conductivity was $5.85 \times 10^{-7}$ S/cm.

An OLED device was fabricated and tested the same way as in Example 1 except that Dispersion 9 was used to spin coat the HIL. Dispersion 9 was filtered with a 450 nm PVDF filter before spin coating. The thickness of the PTT layer was about 30 nm. The device showed very poor performance. Only very low current could be passed through the device. The device reached 1 cd/m² at 3.4 V, with a maximum external quantum efficiency of 0.59%. Due to the low conductivity of the PTT film, the emission of the device was very weak. The maximum brightness was 150 cd/m² at a current density of 51.5 mA/cm² and 11.9 V.

Example 10

PTT Dispersion Prepared at 15° C. with High Shear Mixing, Film and OLED

A dispersion was prepared following the same procedures as in Example 3, except that the reaction was carried for 1 hour at 15° C. The dispersion is hereafter referred to as Dispersion 10. Dispersion 10 was filterable with a 200 nm PVDF filter. A thin film of Dispersion 10 was prepared and the conductivity of the film measured the same way as in Example 1. The conductivity was $8.10 \times 10^{-4}$ S/cm.

A light emitting polymer solution of MEH-PPV ADS130RE from American Dye Source, Inc.) in toluene was prepared by dissolving 22.5 mg of MEH-PPV in 3.15 g of toluene on a hot plate at 60° C. for 2 hr, and then filtered with a 1000 nm filter. The solution is hereafter referred to as Solution B.

An OLED device was fabricated and tested the same way as in Example 1 except that Dispersion 10 was used to spin coat the HIL and Solution B was used to spin coat (at a spin rate of 2000 rpm) the 70-nm-thick MEH-PPV. Dispersion 10 was filtered with a 450 nm PVDF filter before spin coating. The thickness of the PTT layer was about 30 nm. The device reached 1 cd/m² at 2.2 V, with a maximum external quantum efficiency of 1.35%. At a current density of 100 mA/cm², the device showed a brightness of 1,780 cd/m². At a current density of 1000 mA/cm², the brightness was 17,600 cd/m².

Example 11

PTT Dispersion Prepared at 15° C. with High Shear Mixing, Film and OLED

A dispersion was prepared following the same procedures as in Example 3, except that the reaction was carried for 20 minutes at 15° C. The dispersion is hereafter referred to as Dispersion 11. Dispersion 11 was filterable with a 200 nm filter. A thin film of Dispersion 11 was prepared and the conductivity of the film measured the same way as in Example 1. The conductivity was $1.73 \times 10^{-6}$ S/cm.

An OLED device was fabricated and tested the same way as in Example 10 except that Dispersion 11 was used to spin coat the HIL. Dispersion 11 was filtered with a 450 nm PVDF filter before spin coating. The thickness of the PTT layer was about 30 nm. The device reached 1 cd/m$^2$ at 2.4 V, with a maximum external quantum efficiency of 1.15%. At a current density of 100 mA/cm$^2$, the device showed a brightness of 1,590 cd/m$^2$. The maximum brightness was 5,160 cd/m$^2$ at a current density of 520 mA/cm$^2$ and 9.5 V.

Example 12

Film and OLED of PEDOT (Comparative Example)

A thin film of PEDOT was prepared using an electronic grade Baytron P Al 4083 PEDOT dipersion (from Bayer Corp.), and the conductivity of the film measured the same way as in Example 1. The conductivity was $1.83 \times 10^{-3}$ S/cm.

An OLED device was fabricated and tested the same way as in Example 1 except that Baytron P Al 4083 PEDOT dispersion was used to spin coat the HIL at a spin rate of 2500 rpm. The PEDOT dispersion was filtered with a 450 nm PVDF filter before spin coating. The thickness of the PEDOT layer was about 40 nm. The device reached 1 cd/m$^2$ at 2.1 V, with a maximum external quantum efficiency of 0.63%. At a current density of 100 mA/cm$^2$, the device showed a brightness of 1,260 cd/m$^2$. At a current density of 1000 mA/cm$^2$, the device showed a brightness of 10,400 cd/m$^2$.

Example 13

Film and OLED of PEDOT (Comparative Example)

A thin film of PEDOT was prepared from electronic grade Baytron P CH8000 PEDOT dispersion (from Bayer Corp.), and the conductivity of the film measured the same way as in Example 1. The conductivity was $2.79 \times 10^{-5}$ S/cm.

An OLED device was fabricated and tested the same way as in Example 1 except that electronic grade Baytron P CH8000 PEDOT dispersion was used to spin coat the HIL at a spin rate of 4000 rpm. The PEDOT dispersion was filtered with a 450 nm PVDF filter before spin coating. The thickness of the PEDOT layer was about 45 nm. The device reached 1 cd/m$^2$ at 2.2 V, with a maximum external quantum efficiency of 0.64%. At a current density of 100 mA/cm$^2$, the device showed a brightness of 1,040 cd/m$^2$. The maximum brightness was 3,050 cd/m$^2$ at a current density of 460 mA/cm$^2$ and 8.3 V.

Example 14

Triplet Emitter and PTT Based OLED

A solution was prepared by dissolving 63.0 mg poly(N-vinylcarbazole) (from Aldrich), 27.0 mg 2-(4-biphenylyl)-5-(4-tert-butylphenyl)-1,3,4-oxadiazole (from Aldrich), and 4.8 mg of triplet emitter tris(2-(4-tolyl)phenylpyridine) iridium (III) (from American Dye Source, Inc.) in 4.0 g chlorobenzene. The solution was filtered with a 200 nm filter and hereafter referred to as Solution C.

An OLED device was fabricated and tested the same way as in Example 1, except that the HIL was fabricated by spin coating Dispersion 2 (after being filtered with a 450 nm PVDF hydrophilic filter) at 1500 rpm for 1 minute and then annealed at 200° C. for 5 minutes under nitrogen protection, and the light emitting layer (135 nm thick) was spin coated from Solution C at a spin rate of 1000 rpm. The device turn-on voltage was 13.0 V, with a maximum efficiency of 4.5%, and a maximum brightness of 28,400 cd/m$^2$.

Discussion of LED Examples

Table 1 summarizes the conductivity, filterability and device performance of Examples 1 to 13. Examples 1, 9, 12 and 13 are Comparative Examples. In the table, $V_{on}$ is the voltage at which the device reaches a brightness of 1 cd/m$^2$. A lower $V_{on}$ is desirable because it implies a lower operation voltage and, consequently, a higher power efficiency. The external quantum efficiency (EQE) is the number of photons emitted per electron injected. The maximum EQE's of the devices are listed. High efficiency is

TABLE 1

Summary of conductivities and performance of ITO/HIL/MEH-PPV/Ca/Ag devices.

| Example | HIL | Filterability | σ (S/cm)[b] | $V_{on}$ (V)[c] | $EQE_{max}$[d] | $B_{100}$ (cd/m$^2$)[e] | $B_{1000}$ (cd/m$^2$)[f] | $R_S$[g] |
|---|---|---|---|---|---|---|---|---|
| Example 1 | PTT | N/F[a] | 1.60E−3 | 4.0 | 0.16% | 150 | 2000 | 1.4 |
| Example 2 | PTT | 0.45 μm | 8.94E−3 | 2.6 | 0.55% | 850 | 7,900 | 75 |
| Example 3 | PTT | 0.45 μm | 1.82E−2 | 2.5 | 0.55% | 1,000 | 8,700 | 156 |
| Example 9 | PTT | 0.2 μm | 5.85E−7 | 3.4 | 0.59% | N/A[h] | N/A[h] | 22 |
| Example 4 | PTT | 0.2 μm | 1.64E−6 | 2.5 | 0.58% | 830 | N/A[h] | 740 |
| Example 11 | PTT | 0.2 μm | 1.73E−6 | 2.4 | 1.15% | 1590 | N/A[h] | 1750 |
| Example 5 | PTT | 0.2 μm | 2.16E−3 | 2.5 | 0.77% | 1,300 | 8,200 | 635 |
| Example 6 | PTT | 0.2 μm | 9.27E−4 | 2.3 | 0.73% | 1,440 | 11,550 | 1840 |
| Example 7 | PTT | 0.2 μm | 3.24E−3 | 2.2 | 0.76% | 1,360 | 10,400 | 380 |
| Example 8 | PTT | 0.2 μm | 2.32E−4 | 2.1 | 0.69% | 1,330 | 9,070 | 7130 |
| Example 10 | PTT | 0.2 μm | 8.10E−4 | 2.2 | 1.35% | 1780 | 17,600 | 6800 |
| Example 12 | PEDOT | 0.45 μm | 1.83E−3 | 2.1 | 0.63% | 1,260 | 10,400 | 2650 |
| Example 13 | PEDOT | 0.45 μm | 2.79E−5 | 2.2 | 0.64% | 1,040 | N/A[h] | 2310 |

[a]Not filterable with 0.45 μm filter;
[b]Conductivity;
[c]Voltage at which the device reach brightness of 1 cd/m$^2$;
[d]Maximum external quantum efficiency;
[e]Brightness at current density of 100 mA/cm$^2$;
[f]Brightness at current density of 1000 mA/cm$^2$;
[g]Rectification ratio at ±5 V;
[h]The device could not support the specified current density.

desirable. The brightnesses of the devices at current densities of 100 and 1000 mA/cm$^2$ are also listed, a larger number implies a brighter and more efficient device. The rectification ratios $R_5$ at ±5 V are also listed. $R_5$ is the ratio of the device current at +5 V to the device current at −5 V. Because a device with lower leakage current is ideal, a large value of $R_5$ is desirable.

In Example 1 (Comparative Example), the dispersion was not filterable with a 450 nm filter, and the LED showed high operation voltage (4.0 V), low efficiency (0.16%), very high leakage current, and almost no rectification up to 5 V ($R_5$=1.4). The dispersions of this invention are filterable by a 450 nm filter. However, if the conductivity is too low (<1× 10$^{-6}$ S/cm), the device performance is also poor, with higher operation voltage and lower maximum brightness because the device cannot support high current density due to the low conductivity of the PTT layer. It was also surprisingly found that several of the PTT based devices (Examples 5, 6, 7, 8, 10, and 11) achieved better performance than PEDOT based devices (Examples 12 and 13).

Additionally, Example 14 is a dispersion, film and LED of this invention that was made using phosphorescent emitter, small molecule tris(2-(4-tolyl)phenylpyridine) iridium (III). Phosphorescent emitter based devices can utilize the triplet excitons, therefore, the device has a higher efficiency (4.5%). This example demonstrates that the PTT film can be used for phosphorescent emitter based OLEDs.

Example 15

Photovoltaic Device Using PTT as the Hole Transporting Layer (HTL)

Figure 4:
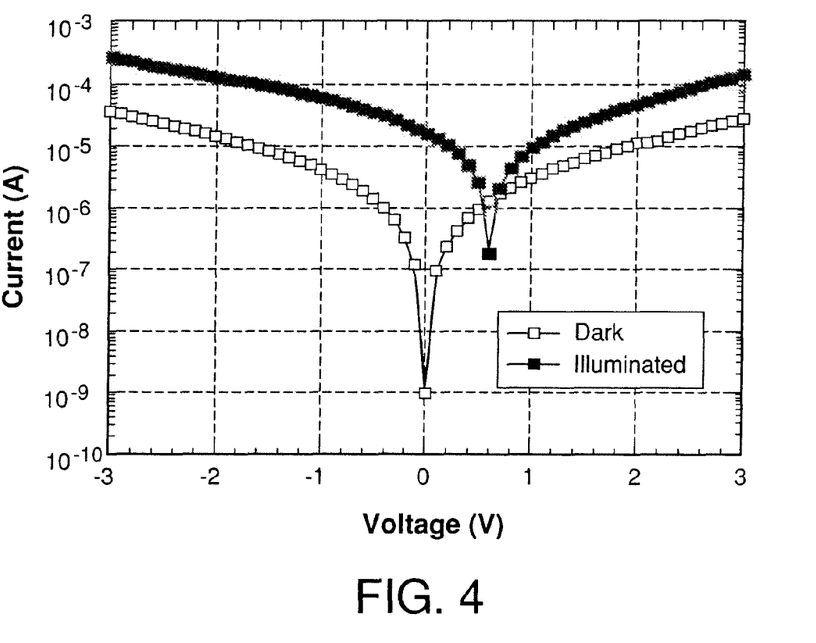
FIG. 4 is a graph of the current versus voltage for the PV device of Example 15.

A solution was prepared by dissolving 8.2 mg of N,N'-bis (3-methylphenyl)-N,N'-diphenylbenzidine (CAS#65181-78-4, from Aldrich), 7.6 mg of N,N'-bis(2,5-di-tert-butylphenyl-3,4,9,10-peryienedicarboximide (CAS #83054-80-2, from Aldrich), 7.2 mg PAE-2 (a poly(arylene ether)) (U.S. Pat. No. 5,658,994) and 7.2 mg of Ardel D100 polyarylate (PAL) in 1.53 g of chlorobenzene and filtered with a 0.2 µm filter. The solution is referred to as Solution D. An ITO substrate was cleaned and treated with oxygen plasma as in Example 1. The ITO substrate was spin coated with Dispersion 2 at a spin rate of 1000 rpm and then annealed at about 160° C. for 15 minutes under nitrogen protection. Then Solution D was applied onto the PTT layer at a spin rate of 1000 rpm. Finally, the sample was masked, and a layer of 150-nm-thick Al was deposited via thermal vacuum evaporation at a pressure of 1.1×10$^{-7}$ Torr. The active area of the device was about 7 mm$^2$. The finished device was connected to a Keithley 2400 SourceMeter (ITO side to the positive electrode and Al to the negative electrode), and the current-voltage curves of the device in the dark and under the illumination of a 150 W Xenon lamp were measured. An open circuit voltage of 0.6 V and a short circuit current of 15.8 µA were obtained. The current-voltage characteristics are shown in FIG. 4.

Example 16

Photovoltaic Device Using PTT as the HTL

Figure 5:
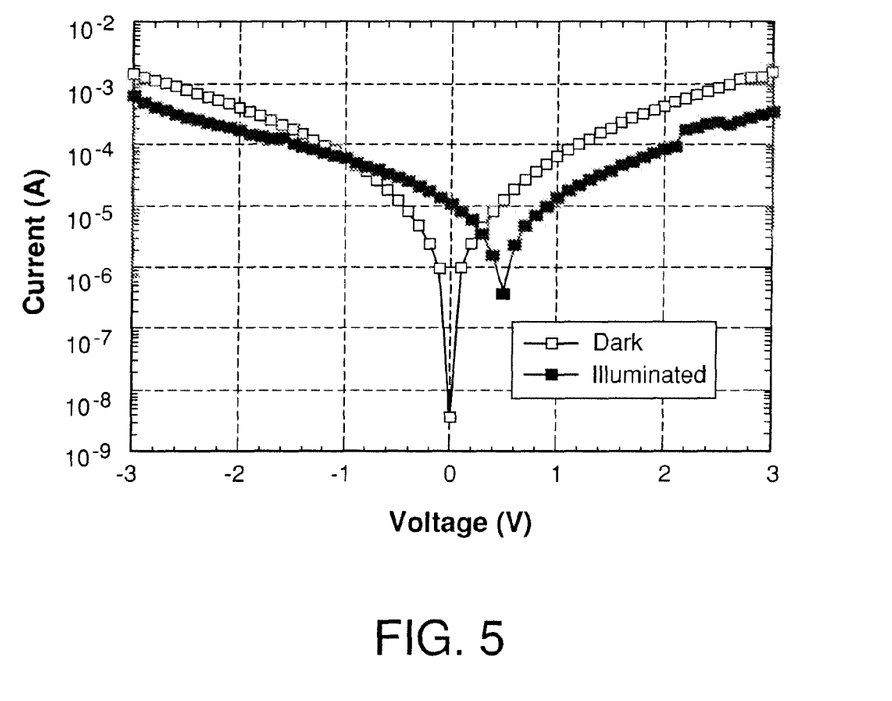
FIG. 5 is a graph of the current versus voltage for the PV device of Example 16.

A solution was prepared by dissolving 6.4 mg of N,N'bis (3-methylphenyl)-N,N'-diphenylbenzidine, 6.9 mg of N,N'-bis(2,5-di-tert-butylphenyl)-3,4,9,10-perylenedicarboximide, 3.8 mg MEH-PPV, and 3.2 mg of Ardel D100 polyarylate in 1.56 g of chlorobenzene and filtered with a 0.2 µm filter. The solution is referred to as Solution E. An ITO substrate was cleaned and treated with oxygen plasma as in Example 1. The ITO substrate was spin coated with Dispersion 2 at a spin rate of 1000 rpm and then annealed at about 160° C. for 15 minutes under nitrogen protection. Then Solution E was applied onto the PTT layer at a spin rate of 1000 rpm. Finally, a layer of 150-nm-thick Al was deposited and the device tested the same way as in Example 15. An open circuit voltage of 0.4 V and a short circuit current of 11.0 µA were obtained. The current-voltage characteristics are shown in FIG. 5. A control device without PTT layer was fabricated side by side for comparison. Under the same illumination condition, the control device had an open circuit voltage of less than 0.1 V.

The detailed description and specific examples, while indicating preferred embodiments of the invention, are given by way of illustration only, since various changes and modifications within the spirit and scope of the invention will become apparent to those skilled in the art from this detailed description. All the references and patents cited herein are incorporated in their entireties by reference.

The invention claimed is:

1. A method for making a dispersion comprising at least one conducting polymer the method comprising:
    (a) combining water, at least one thiophene and at least one polymeric carboxylic acid,
    (b) introducing at least one oxidant to form a reaction mixture,
    (c) polymerizing the reaction mixture at a temperature of less than 50° C. while stirring the reaction mixture;
    (d) filtering the reaction mixture, and
    (e) recovering the dispersion;
    wherein the method is conducted for a time sufficient to generate particles having a particle size of less than 200 nm,
    wherein a film drop cast from the dispersion has a conductivity from 10$^{-3}$ to 10$^{-6}$ S/cm when measured using the four point probe method,
    wherein the dispersion comprises less than 1 ppm of metal ions and less than 1 ppm of anions of inorganic acids, and
    wherein the stirring is shear mixing from 5,000 rpm to 24,000 rpm.

2. The method of claim 1 wherein the conducting polymer comprises substituted or unsubstituted, uncharged or charged polymerized units of (I)

where R is hydrogen, substituted or unsubstituted ($C_1$-$C_{18}$)-alkyl, preferably ($C_1$-$C_{10}$)-alkyl, in particular ($C_1$-$C_6$)-alkyl, for example, t-butyl, ($C_3$-$C_7$)-cycloalkyl, ($C_1$-$C_{18}$)-alkyloxy, preferably ($C_1$-$C_{10}$)-alkyloxy, or ($C_2$-$C_{18}$)-alkyloxy ester, phenyl and substituted phenyl, $SF_5$.

3. The method of claim 1 wherein the polymeric carboxylic acids comprise at least one member selected from the group consisting of polyacrylic acids, polymethacrylic acids and polymaleic acids.

4. The method of claim 1 wherein the oxidant comprises at least one member selected from the group consisting of FeCl$_3$, Fe(ClO$_4$)$_3$, Fe$_2$(SO$_4$)$_3$, H$_2$O$_2$, K$_2$Cr$_2$O$_7$, alkali or ammonium persulfates, alkali perborates, potassium permanganate and copper tetrafluoroborate.

5. The method of claim 1 wherein the polymerization is conducted for less than about 4 hours.

6. The method of claim 1 further comprising exposing reaction mixture to an ion exchange resin after the polymerization.

7. The method of claim 1 wherein the temperature ranges from about 8 to about 18° C.

8. A method for making a dispersion comprising at least one conducting polymer the method comprising:
   (a) combining water, at least one thienothiophene and at least one polyanion,
   (b) introducing at least one oxidant to form a reaction mixture,
   (c) polymerizing the reaction mixture at a temperature of less than 50° C. while stirring the reaction mixture;
   (d) filtering the reaction mixture, and
   (e) recovering the dispersion;
   wherein the method is conducted for a time sufficient to generate particles having a particle size of less than 200 nm,
   wherein a film drop cast from the dispersion has a conductivity from $10^{-3}$ to $10^{-6}$ S/cm when measured using the four point probe method,
   wherein the dispersion comprises less than 1 ppm of metal ions and less than 1 ppm of anions of inorganic acids, and
   wherein the stirring is shear mixing from 5,000 rpm to 24,000 rpm.

9. The method of claim 8 wherein the polyanion comprises at least one polymeric carboxylic acid.

10. The method of claim 8 wherein the polyanion comprises at least one member selected from the group consisting of polymeric carboxylic acids and polymeric sulfonic acids.

11. The method of claim 10 wherein the polymeric sulfonic acids comprise at least one of polystyrene sulfonic acids and polyvinyl sulfonic acids.

12. The method of claim 10 wherein the polyanion comprises at least one member selected from the group of copolymers of vinyl carboxylic and vinyl sulfonic acids optionally with other polymerizable monomers.

13. The method of claim 8 wherein the thienothiophene comprises thieno[3,4-b]thiophene.

\* \* \* \* \*